US005789009A

United States Patent [19]

Kordic et al.

[11] Patent Number: 5,789,009
[45] Date of Patent: Aug. 4, 1998

[54] PIZZA PIE WITH CRUST STRUCTURE

[75] Inventors: Branko Kordic, Chardon, Ohio; Roger R. Dube, Boca Raton, Fla.

[73] Assignee: Silverback Environments, Inc., Chardon, Ohio

[*] Notice: The term of this patent shall not extend beyond the expiration date of Pat. No. 5,417,150.

[21] Appl. No.: 635,241

[22] Filed: Apr. 12, 1996

Related U.S. Application Data

[60] Continuation-in-part of Ser. No. 445,386, May 19, 1995, Pat. No. 5,508,049, which is a division of Ser. No. 80,081, Jun. 18, 1993, Pat. No. 5,417,150.

[51] Int. Cl.$^6$ ............................................. A21D 13/00
[52] U.S. Cl. .......................... 426/391; 426/503; 426/505; 426/512
[58] Field of Search ........................... 99/432, 433, 422, 99/DIG. 15; 426/512, 572, 496, 505, 391, 503, 523, 144

[56] References Cited

U.S. PATENT DOCUMENTS

| D. 311,304 | 10/1990 | Virk | D7/672 |
|---|---|---|---|
| D. 315,849 | 4/1991 | Brunner | D7/672 |
| 883,296 | 3/1908 | Cook . | |
| 1,888,562 | 11/1932 | Trompeter . | |
| 3,098,597 | 7/1963 | Johnson et al. | 99/DIG. 15 |
| 3,166,027 | 1/1965 | Sprenzel . | |
| 3,194,185 | 7/1965 | Spinoza . | |
| 3,322,074 | 5/1967 | Malnory . | |
| 3,473,489 | 10/1969 | Sargent | 426/505 |
| 3,864,071 | 2/1975 | LaMonica . | |
| 4,081,169 | 3/1978 | Lauter | 249/115 |
| 4,184,421 | 1/1980 | Ahlgren | 99/432 |
| 4,606,923 | 8/1986 | Ricke | 426/496 |
| 4,955,125 | 9/1990 | Steinman | 99/432 |
| 5,004,121 | 4/1991 | Howe | 220/458 |
| 5,253,565 | 10/1993 | Burton . | |

OTHER PUBLICATIONS

Copy of pages from book entitled Pizza, by James McNair, Copyright 1987, pp. 32,33.

*Primary Examiner*—Reginald L. Alexander
*Attorney, Agent, or Firm*—Christopher H. Hunter

[57] ABSTRACT

A pizza mold and method for making a pizza includes a frame having a generally planar surface with one or more cavities extending across an extent of the frame. One cavity can be disposed at a location on the frame which corresponds to a desired configuration for the pizza. One or more cavities can in addition or alternatively extend across the frame in a desired geometric or fanciful configuration, such as an alpha-numeric character, cartoon character, etc. The dough is brought into contact with the frame either by forming the dough across the surface of the frame such that the dough covers the frame and is pressed into the cavities, or the dough can be located only within the cavities. In the former case, the frame is removed with the cavities imparting raised ridges of dough on the crust, while in the latter case the flat pizza pie can be formed separately and the frame inverted such that the dough in the frame is transferred onto the surface of the pie to impart the raised ridges of dough on the pie. Toppings can be located between (or within) the ridges on the dough, and the dough is baked such that the ridges form crust on the pizza.

12 Claims, 3 Drawing Sheets

PIZZA PIE WITH CRUST STRUCTURE

This application is a continuation-in-part of application Ser. No. 08/445,386 filed on May 19, 1995 now U.S. Pat. No. 5,508,049 which is a Divisional of application Ser. No. 08/080,081 filed Jun. 18, 1993, now U.S. Pat. No. 5,417,150

FIELD OF THE INVENTION

The present invention relates generally to dough forming devices and methods, and more particularly to a pizza mold and method for forming raised ridges of dough (i.e., crust) on the surface of a pizza pie.

BACKGROUND OF THE INVENTION

Pizza making has become a successful industry serving countless individuals. Pizza pies typically have round configuration, although square and rectangular-shaped pizzas are also known and have had some recent acceptance in the consumer market. Toppings such as cheese, meat, and/or vegetables are distributed across the surface of the pizza pie within the area bounded by the crust, and the pie is baked in an oven for a short period of time. After the cooked pizza is removed from the oven, the pizza is sliced into, e.g., wedges or squares.

While automation in the industry has brought rapid and efficient means for mixing, kneading and cooking the pizza dough into a finished pizza pie, it is applicant's belief that there has been little innovation in the configuration of the pizza pie itself (besides the above-mentioned square or rectangular peripheral configurations). In applicant's experience, the pizza pie includes a substantially flat central surface area with a raised crust around only the outer peripheral edge of the pie. When the pizza is sliced, only a small segment of crust accompanies each slice of pizza. Moreover, if the pizza is sliced into squares, it is possible that the inner squares of the pie will fail to have any crust on them whatsoever.

Applicant believes that there is a consumer demand for a pizza pie which has crust formed at locations other than just around the outer peripheral edge of the pie, such that almost any slice of pizza (be it wedge-shaped or square-shaped) will preferably have multiple segments of crust accompanying it. Applicant also believes that there is a demand for a pizza pie which has a fanciful or geometric arrangement of crust across the surface, other than just around the peripheral edges. Applicant believes that such a pizza pie has better texture, flavor, and aesthetic appeal.

Certain dough forming devices and techniques are already known in the art, some of which are applicable to pizza pies. For example, Sprenzel, U.S. Pat. No. 3,166,027; Spinosa, U.S. Pat. No. 3,194,185; Malnory, U.S. Pat. No. 3,322,074; LaMonica, U.S. Pat. No. 3,864,071; and Lauter, U.S. Pat. No. 4,081,169, discloses molds and frames for forming dough into a flat, round configuration, such as typically found with pizza pies. Further, U.S. Pat. No. 883,296 and U.S. Pat. No. DES311,304 disclose molds for forming wedge-shaped slices in flattened, round dough. However, none of the prior devices and techniques address the problem of having only a single segment of crust (or not crust at all) on each slice of pizza, or in having a fanciful or geometric arrangement of crust across the surface of the pie.

SUMMARY OF THE INVENTION

The present invention provides a new and useful pizza mold for pizza dough which forms raised ridges in the dough. The mold is particularly useful for forming concentric ridges of crust on a pizza pie such that practically every slice of the pizza has multiple segments of crust to improve the texture, flavor and aesthetic appeal of the pie. The mold can also be used to form ridges of crust on the surface of the pizza corresponding to any desired shape, including alphanumeric characters, cartoon characters, etc.

The pizza mold according to one aspect of the present invention includes a frame having a peripheral configuration which matches the desired peripheral configuration of the dough. The mold can be round, square or rectangular, depending on whether the finished pizza pie is to be round, square or rectangular. The frame has a plurality of concentric dough cavities formed across the surface of the frame at predetermined radial distances from the geometric axis of the frame. The concentric cavities are preferably spaced at equal intervals and have the same configuration as the mold, e.g., round, square or rectangular. Further, an outer lip extends outwardly around the peripheral edge of the frame to provide a defined area for the pizza dough.

When the mold is brought into contact with the dough, the dough is formed (e.g., rolled) across the surface of the mold within the defined area. Excess dough extending across the lip on the mold is then removed. When the mold is removed, raised ridges on the dough remain in the dough corresponding to the concentric dough cavities in the mold. If the dough is used to form a pizza pie, toppings such as cheese, meat and/or vegetables can be located between adjacent raised ridges on the pie, or can be integrated into the ridges when the dough is first formed into the dough cavities. After the pizza dough is cooked, the raised ridges form crust on the pie at multiple locations across the pie for the pizza-eater's enjoyment.

According to a further aspect of the present invention, the frame can include one or more cavities which correspond to a desired fanciful or geometric configuration to be imparted to the surface of the pizza. In this case, a mound of pizza dough can be initially formed in any conventional manner (e.g., rolled) into a flat pie, and additional dough can be disposed within the cavity (or cavities) of the frame. The frame can then be inverted and located over the flat pie and the additional dough removed from the cavities such as by tapping the inverted frame. The additional dough forms a ridge (or ridges) of dough across the surface of the pie in the desired configuration. A peripheral ridge of dough on the pie can be formed (if desired) such as by hand-forming prior to, or after, the additional dough is disposed on the surface of the pie.

According to this further aspect, the additional dough configuration can be blended into the surface of the pie by pressing along the edges of the ridges. Water can also be applied to the exposed surface of the dough while in the frame cavity, or to the surface of the pizza pie, prior to the additional dough being transferred to the base pie to secure the additional dough ridge to the pie.

It is therefore an advantage of the present invention to provide a dough forming device—preferably for pizza dough—which forms raised ridges of dough on areas other than just the edge of a pizza pie to improve the texture, flavor and aesthetic appeal of the pizza pie.

Other features and advantages of the present invention will become further apparent upon reviewing the following specification and attached drawings.

DETAILED DESCRIPTION OF THE PREFERRED EMBODIMENT

Figure 1:
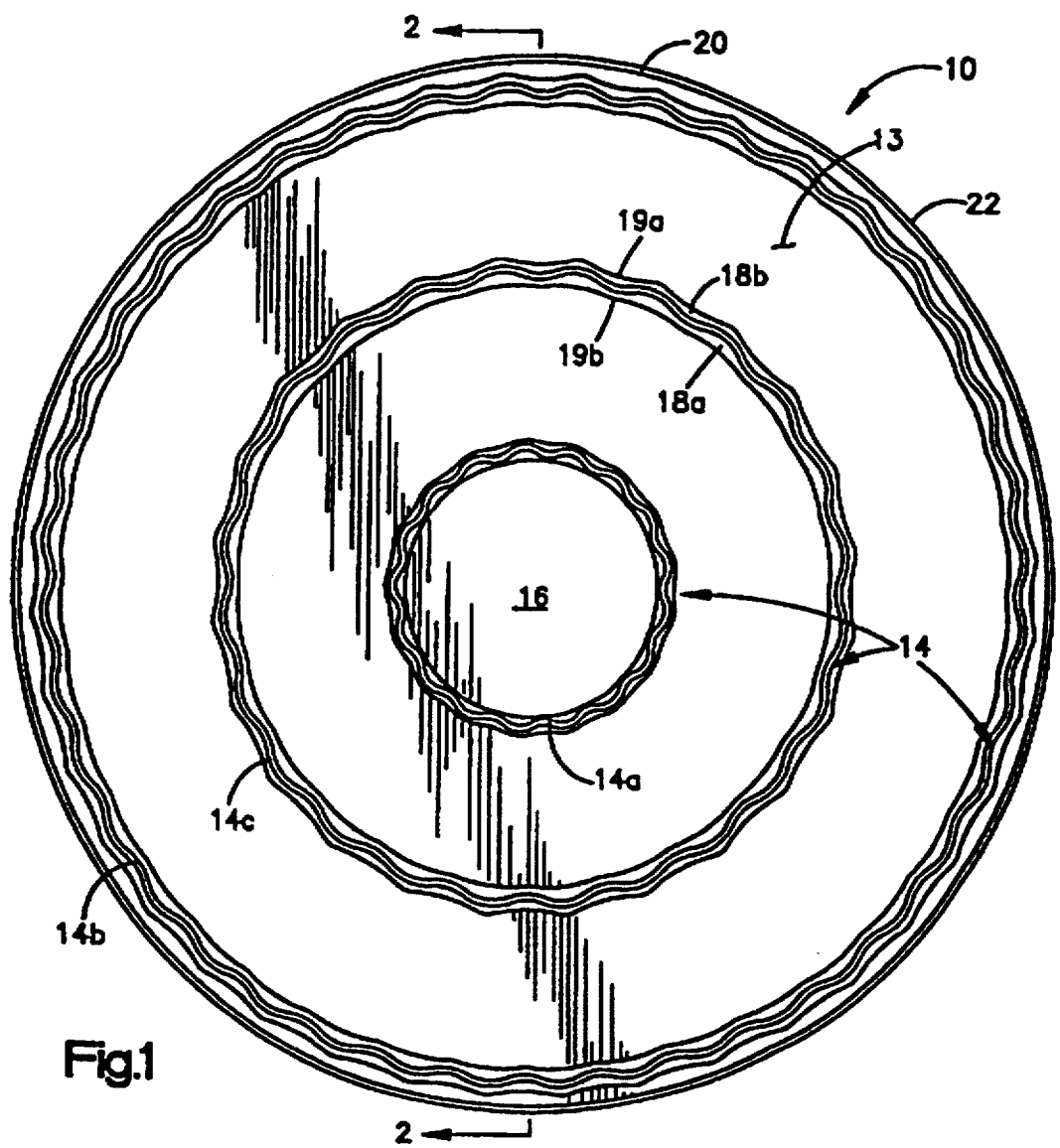
FIG. 1 is a perspective view of an annular pizza mold formed in accordance with the principles of the present invention.
Figures 2, 4:
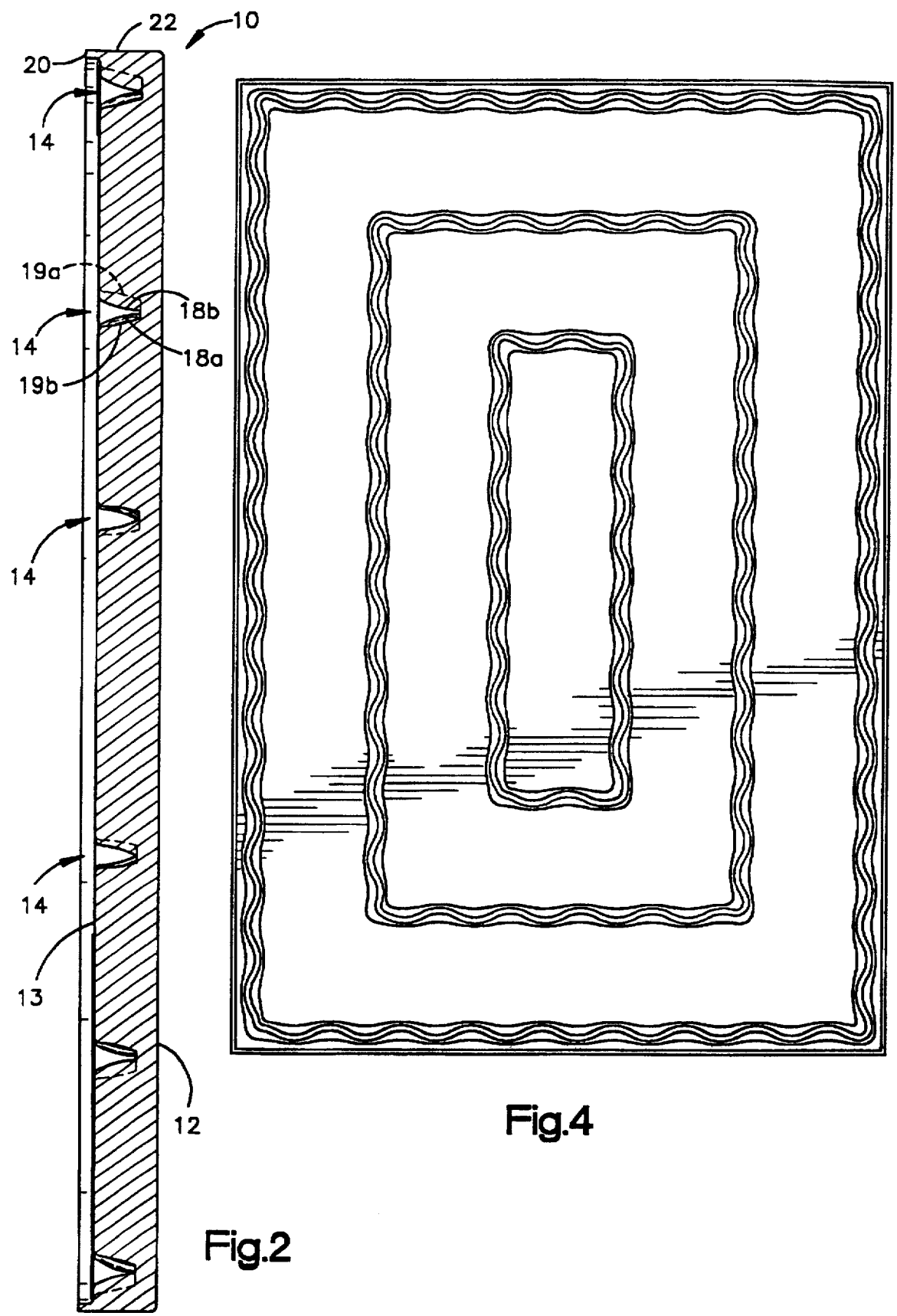
FIG. 2 is a cross-sectional side view of the annular pizza mold taken substantially along the plane described by the lines 2—2 of FIG. 1.
FIG. 4 is a pizza pie formed similar to that of FIG. 3, but using a rectangular pizza mold.

Referring to the drawings, and initially to FIGS. 1 and 2, a pizza mold, indicated generally at 10, is shown for forming raised ridges in pizza dough. It should be apparent to those skilled in the art upon reading the following description, however, that the principles of the present invention can also be applied to forming dough other than pizza dough, for example, bread or cake dough. Such alternative uses are therefore within the scope of the present invention. As such, the terms "pizza mold" and "pizza dough" are not intended to be limiting the present invention to only forming pizza pies. Rather, the principles of the present invention are applicable to any type of dough which can be formed using the following described techniques.

The pizza mold 10 comprises a frame 12 having a predetermined peripheral configuration. In FIGS. 1 and 2, the frame 12 has a disc-shaped annular configuration; however, the frame 12 could just as well have other geometric configurations, such as rectangular or square configurations. According to one aspect of the present invention which will be described herein in more detail, the peripheral configuration of the frame (or at least the dough forming structure on the frame) determines the final configuration of the pizza pie. Hence, according to this aspect, the configuration of the frame is typically dictated by the desired configuration of the pizza pie.

The frame 12 is formed from an appropriate material which is compatible with food products, for example, stainless steel or plastic-injected fiberglass. The frame can have an appropriate coating thereon for the contacting surface, such as a spray-coating or layered coating, to maintain sanitary conditions. Alternative material for the pizza mold of the present invention should also be apparent to those skilled in the art, as long as the material complies with all relevant food-handling codes and regulations.

The frame of the pizza mold has a flat bottom surface 13 with a series of preferably concentric dough cavities, indicated generally at 14, formed at predetermined distances from the geometric axis 16 of the frame. For an annular frame, the concentric dough cavities can be formed in annular configurations having increasing radii across the surface of the frame. For example, as illustrated in FIG. 1, an inner dough cavity 14a can be located closest to the geometric axis 16 of the mold, an outer dough cavity 14b can be located proximate the peripheral edge of the pizza mold, and a middle dough cavity 14c can be interposed between inner dough cavity 14a and outer dough cavity 14b.

For a pizza pie of approximately 15 inches in diameter (i.e., a "medium" pizza pie), preferably three concentric dough cavities are used on the pizza mold. On the other hand, for a pizza pie of approximately 10 inches in diameter (i.e., a "small" pizza pie), preferably only two concentric dough cavities are used. It is also preferred that one dough cavity be located adjacent the peripheral edge of the mold and that the dough cavities are located approximately two inches apart from each other in the radial direction. The number and location of dough cavities formed in the mold can also vary depending upon the particular application; however, in general, enough space should be left between adjacent dough cavities such that toppings can be easily added between adjacent raised ridges of dough on the pizza pie, as will be described herein in more detail.

It is preferred that the depth of each dough cavity be between about ¾" and 1" deep, while the width of each dough cavity be about ¾" wide. The dimensions of the dough cavities 14, however, can also vary depending upon the particular pizza pie. The dough cavities can also have a rounded cross-sectional configuration, or can be pointed or wedged-shaped. If desired, each dough cavity can also include a series of indents 18a, 18b, formed at even, spaced-apart locations along the inner wall 19a and the outer wall 19b, respectively, of each cavity. The indents 18a on inner wall 19a can be located in staggered offset relation to indents 18b on outer wall 19b so as to form an aesthetically pleasing "crimped" shape on the dough after the dough has been formed into the mold.

Finally, a lip 20 is formed along the peripheral edge 22 of the pizza mold and defines a sidewall of the outermost dough cavity 14b. The lip extends outwardly from the bottom surface of the mold to facilitate forming the dough into the configuration of the pizza mold. Preferably, the lip extends outwardly about ¼" beyond the bottom surface of the mold.

As described above, the pizza mold is preferably a one-piece disc with a flat bottom surface. However, it is also within the scope of the invention to form the mold from more than one piece, if desired. Also, although the dough cavities are shown as being concentric with the geometric axis of the pizza mold, it is also within the scope of this invention to form the dough cavities off-center, or in other configurations, for example, as stripes across the frame. In fact, in its broadest sense, the present invention is directed toward forming some configuration of raised ridges on the pizza dough at locations other than just around the peripheral edge of the pizza dough.

The ingredients for the pizza dough for the present invention are, of course, conventional in nature. The pizza dough typically includes water or milk, flour or meal, and yeast. The ingredients are mixed and kneaded as appropriate to provide a mound of dough. The dough can then be rolled flat and placed into the pizza mold in contact with the bottom surface. The dough is then formed flat across the surface of the pizza mold, such as by using a rolling pin (not shown). Alternatively, the mold can also be pressed against the flattened dough similar to the action of a cookie-cutter, or the pizza mold can be incorporated into automated machinery which would perform the same forming process as described above. In any case, the dough is formed into the concentric dough and conforms substantially thereto. The lip 20 of the mold generally forms the outer peripheral configuration of the dough when the dough is formed, and any excess dough extending across the lip can be trimmed off.

Figure 3:
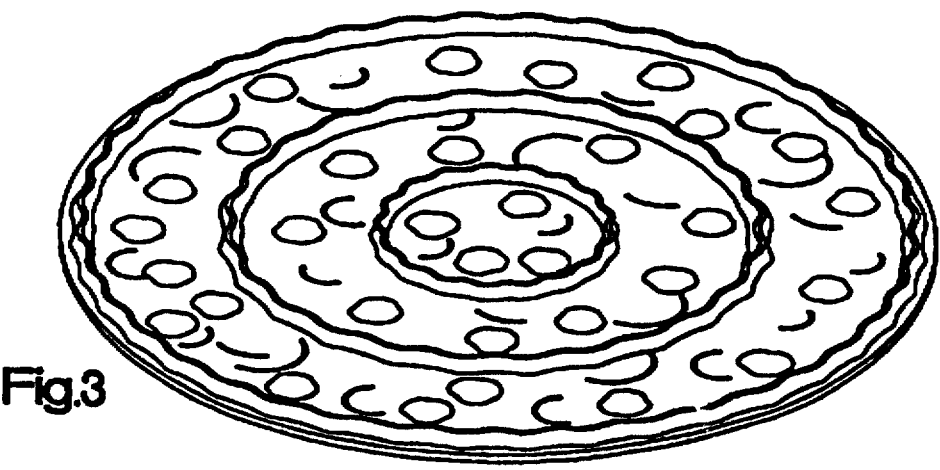
FIG. 3 is a pizza pie formed using the annular pizza mold of FIG. 1.

When the pizza is removed, the pizza has a generally annular configuration corresponding to the configuration of the mold, such as illustrated in FIG. 3. The concentric dough cavities in the pizza mold form annular raised dough ridges on the surface of the pizza dough which correspond to the location of the dough cavities in the mold.

After the pizza mold has been formed as described previously, appropriate toppings, e.g., cheese, meat and/or vegetables can be located between adjacent raised dough ridges on the surface of the pizza dough. Each topping can be located across the entire pizza, or a different topping can be located in each concentric "ring." Alternatively (or in addition), the toppings can be incorporated into the ridges of dough to create a "stuffed crust" pizza. One advantage of having adjacent raised dough ridges spaced two inches apart is that many commercially-available pepperoni sticks have almost a two inches diameter, so that the pepperoni slices fit nicely between the adjacent dough ridges when the toppings are added to the surface of the pizza. The annular raised ridges thereby also facilitate the placement of toppings on the pizza pie in an orderly manner.

When the pizza dough having the plurality of raised ridges is baked in an oven (using conventional baking techniques), the raised dough ridges form a crust across a significant portion of the pie. When the pizza pie is sliced into normal-sized pieces, practically every slice of pizza has at least one segment of crust on it other than the crust around the peripheral edge. In fact, most slices should have numerous segments of crust thereon at spaced-apart locations on the slice. The additional crust on the slices of pizza adds texture, flavor and aesthetic appeal to the cooked pizza.

As indicated above, the principles of the present invention are preferably directed toward a round pizza pie as illustrated in FIG. 3. However, the principles can also be used to form pizza pies in other configurations, such as rectangular as illustrated in FIG. 4, or square. In FIG. 4, the raised ridges of the dough have a rectangular configuration at predetermined distances from the geometric axis of the pizza. Again, toppings can be located between the raised ridges on the pizza dough when making a pizza pie. All other design aspects are for a rectangular or square pizza mold are the same as discussed previously with respect to the round pizza mold. For example, for a rectangular or square frame, the dough cavities can be formed in rectangular or square configurations across the surface of the frame. Additionally, the frame can have a rectangular or square peripheral configuration, depending upon the desired peripheral configuration of the pizza.

Figure 5:
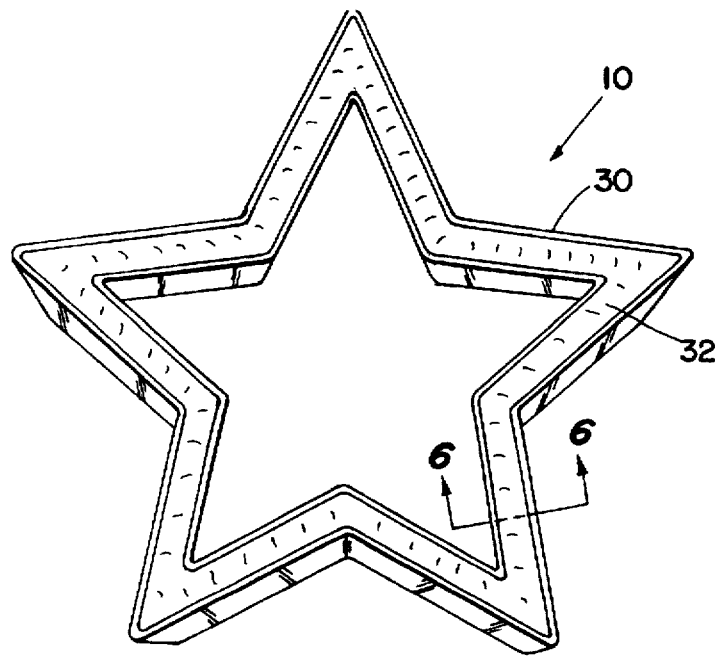
FIG. 5 is a perspective view of a pizza mold formed in accordance with a further aspect of the present invention.

According to a further aspect of the present invention as illustrated in FIG. 5, the pizza mold 10 can have a frame 30 which is not necessarily related to the peripheral configuration of the pizza pie, but rather preferably relates only to the configuration of the dough ridges located inwardly of the peripheral edge. For example, frame 30 can include a single cavity 32 which extends in a geometric or fanciful configuration, such as in a ring as described previously, or in a star shape illustrated in FIG. 5. Other fanciful shapes are of course possible, including alpha-numeric characters, cartoon characters, etc. In addition, while the frame in FIG. 5 is illustrated as having a continuous form, and being formed in one piece, it is anticipated that the frame could be discontinuous, and could have a number of separate pieces, each of which could form a portion of the resulting configuration. The frame can be formed from conventional material appropriate for the food handling industry, and is preferably formed from sheet metal which is easily workable (bent, cut, etc.) into a desired shape. Again, the metal can be coated if necessary to comply with any relevant health codes for handling food, and can have the cavity dimensions described above.

Figure 6:
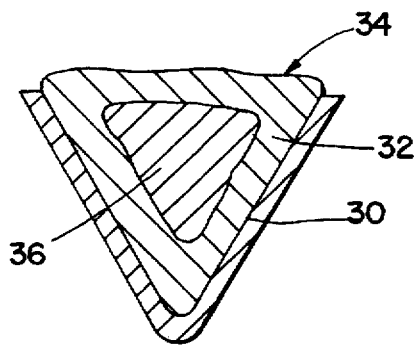
FIG. 6 is a cross-sectional view of the pizza pie mold taken substantially along the plane described by the lines 6—6 of FIG. 5.
Figure 7:
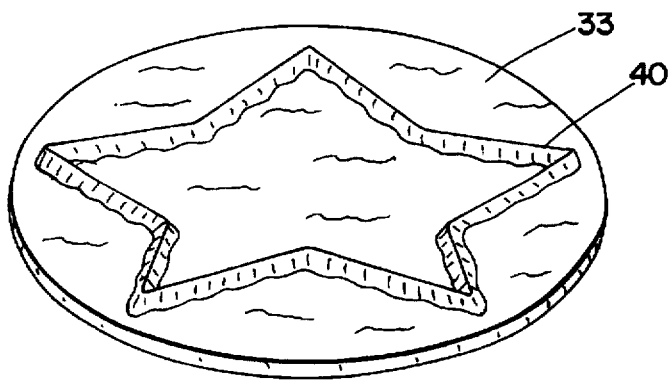
FIG. 7 is an enlarged view of a pizza pie formed according to the further aspect of the present invention.

The periphery of the frame 30 illustrated in FIG. 5 could define the periphery of the pizza pie as in the first aspect of this invention, however as indicated previously, the frame preferably is only used to define the geometric or fanciful form on the surface of the pizza, with the pie being otherwise formed in a typical manner, i.e., rolling the dough into a flat base pie, as indicated at 33 in FIG. 7. In this case, additional pizza dough, indicated generally at 34, is located within the cavity 32 (FIG. 6) in the frame. If desired, a conventional filling or topping, as indicated at 36, can be incorporated into the dough for a "stuffed crust" pizza. The cavity is filled with the dough with the dough preferably slightly overflowing the cavity.

When the cavity is completely filled, the frame 30 is inverted over the base dough, and the additional dough in the cavity is removed, such as by tapping the outer surface of the frame. Non-stick spray previously applied to the inside surface of the frame also facilitates the removal of the dough. The configuration of the dough in the cavity of the frame is thereby transferred to the surface of the pizza pie as a raised ridge of dough, indicated at 40.

The edges of ridge 40 can be pressed by hand to integrate (blend) the ridge more cleanly and securely with the surface of the pie. The surface of the pizza or the exposed surface of the dough in the frame cavity can also be precoated with water to provide good adhesion between the ridge of the dough and the underlying pizza pie. The peripheral edge of the pie can then be formed by hand to have a peripheral ridge of crust, if desired. This step can also be performed prior to the additional dough being transferred to the base dough. Appropriate topping can be located across the surface of the pizza pie, and the pizza pie with configuration of crust can be baked in an oven (as described previously) and enjoyed. Again, the additional crust on the slices of pizza adds texture, flavor and aesthetic appeal to the cooked pizza.

As indicated above, the present invention provides a new and useful mold for forming dough products such as pizza dough. Although the invention has been described in its preferred form with a certain degree of particularity, it is understood that the present disclosure has been by way of example, and that numerous changes in the details of construction and the combination and arrangements of parts may be resorted to without departing from the spirit and scope of the invention as hereinafter claimed. It is intended that the patent shall cover, by suitable expression in the appended claims, whatever features of patentable novelty exists in the invention disclosed.

What is claimed is:

1. A method of forming pizza dough and for baking the formed dough to make a baked pizza, comprising the steps of:

preparing a mound of pizza dough, locating a mold in contact with the pizza dough, said mold having a frame with at least one cavity formed on a surface of the frame, said surface of said frame being designed to be brought into contact with the dough to form at least one raised ridge on a surface of the dough corresponding to the at least one cavity, forming the pizza dough into the mold such that the mold forms at least one raised ridge on a surface of the dough corresponding to the at least one cavity in the surface of the mold, removing the pizza dough from the mold, and baking the pizza dough in an oven to form a substantially flat piece of baked pizza having at least one raised ridge of crust formed on a surface thereof.

2. The method as in claim 1, wherein the step of forming the pizza dough into the mold comprises contacting the mold with the dough and pressing the dough into at least one cavity such that the dough takes on the configuration of the at least one cavity.

3. The method as in claim 2, wherein said mold includes a first cavity formed adjacent the periphery of the mold which matches a desired peripheral configuration for the baked pizza, and another cavity spaced inwardly from the first cavity, wherein when the pizza dough is formed into the mold, the first cavity forms a peripheral raised ridge on the dough corresponding to the desired peripheral configuration of the pizza, and said another cavity forms a raised inner ridge on the dough spaced inwardly from the peripheral ridge.

4. The method as in claim 1, further including the step of locating a topping along the surface of the dough in the area around the at least one raised ridge before the pizza dough is baked.

5. The method as in claim 1, further including the step of introducing a topping into the at least one raised ridge such that the topping is integral with the raised ridge before the pizza is baked.

6. The method as in claim 5, further including the step of imbedding the topping into the at least one raised ridge such that at least one raised ridge completely encompasses the topping.

7. A method of forming pizza dough and for baking the formed dough to make a baked pizza, comprising the steps of:

preparing a mound of pizza dough, forming the pizza dough into a flat pie with a predetermined peripheral configuration, locating additional pizza dough in a mold, said mold having with at least one cavity formed on a surface of the frame with said additional pizza dough being located in the at least one cavity, transferring the additional dough in the mold to a surface of the pie such that the additional dough forms at least one raised ridge on the surface of the pie corresponding to the at least one cavity, and baking the pizza dough in an oven to form a substantially flat piece of baked pizza with said additional dough forming at least one raised ridge of crust formed on a surface of the pizza pie.

8. The method as in claim 7, wherein the step of forming the pizza dough into the mold comprises contacting the mold with the dough and pressing the dough into at least one cavity such that the dough takes on the configuration of the at least one cavity.

9. The method as in claim 7, wherein said mold includes a first cavity corresponding substantially to the peripheral configuration of the flat pie, and another cavity spaced inwardly from the first cavity, wherein the additional dough is located in the first cavity and the another cavity of the mold, and when the additional dough is transferred to the surface of the pie, the additional dough in the first cavity forms a first raised ridge of dough on the surface of the pie adjacent the periphery of the pie, and the additional dough in the another cavity forms another raised ridge of dough on the surface of the pie spaced inwardly from the first raised ridge, and both said first raised ridge of dough and said another raised ridge of dough form a raised ridge of crust on the surface of the pie when the pizza dough is baked in the oven.

10. The method as in claim 7, further including the step of integrating the at least one raised ridge of dough into the pizza dough forming the pie.

11. The method as in claim 10, wherein said step of integrating comprises hand-forming the additional dough such that the at least one raised ridge of dough is blended into the dough forming the pie.

12. The method as in claim 10, wherein the step of integrating comprises coating with water one of an exposed surface of the additional dough while the additional dough is in the at least one cavity in the mold, or coating the surface of the pizza pie before the additional dough is transferred to the surface.

* * * * *